United States Patent [19]
Rouland

[11] Patent Number: 5,080,428
[45] Date of Patent: Jan. 14, 1992

[54] FOLDABLE ROOF ASSEMBLY FOR VEHICLES HAVING A TARGA TOP

[76] Inventor: Paul K. Rouland, 94 Aliento, Rancho Santa Marguerita, Calif. 92688

[21] Appl. No.: 708,695

[22] Filed: May 31, 1991

Related U.S. Application Data

[63] Continuation of Ser. No. 457,890, Dec. 27, 1989.

[51] Int. Cl.$^5$ .............................. B60J 7/11; B60J 7/14
[52] U.S. Cl. .................................... 296/218; 296/219; 296/220; 49/371; 16/382
[58] Field of Search ............... 296/216, 218, 219, 220; 49/248, 371; 16/366, 382, 387

[56] References Cited

U.S. PATENT DOCUMENTS

| | | | |
|---|---|---|---|
| 1,880,208 | 10/1932 | McMullen | 296/219 |
| 3,348,877 | 1/1966 | Caramanna | 296/219 |
| 3,476,437 | 11/1969 | Schroeder et al. | 296/218 |
| 3,494,659 | 2/1970 | Trenkler | 296/218 |
| 3,622,197 | 11/1971 | Vogelei et al. | 296/218 X |
| 4,138,155 | 2/1979 | Chrysler | 296/218 |
| 4,330,150 | 5/1982 | Dunchock et al. | 296/218 |
| 4,552,401 | 11/1985 | Trenkler | 296/219 |
| 4,801,173 | 1/1989 | Trenkler | 296/218 |

FOREIGN PATENT DOCUMENTS

| | | | |
|---|---|---|---|
| 919219 | 10/1954 | Fed. Rep. of Germany | 16/382 |
| 1111964 | 7/1961 | Fed. Rep. of Germany | 296/219 |

*Primary Examiner*—Dennis H. Pedder
*Attorney, Agent, or Firm*—Leonard Tachner

[57] ABSTRACT

A novel TARGA top assembly which is of a lightweight folding configuration adapted to be installed in the roof of a vehicle of the type having a rear roof portion and a forward roof portion. The TARGA top assembly of the present invention comprises a pair of fiberglass, contour-shaped panels having a ridge along the periphery thereof and being shaped to conform to the accessible region between the forward and rear roof portions of the vehicle. A fabric-type covering similar to those fabrics used for vinyl or convertible vehicle tops may be used on the exterior surface of the roof assembly of the present invention, primarily for aesthetic appearance purposes but also to prevent the spaced region between the two panels from admitting any rain or air during vehicle operation. A principal feature of the present invention comprises a novel hinge having a spacer and a pair of insert members, the latter being adapted to be implanted into the fiberglass material forming the aforementioned ridge preferably along the front and back margins of the ridge along the centerline of the roof assembly so that the two panels can be folded, one on top of the other, for easy storage.

4 Claims, 4 Drawing Sheets

FOLDABLE ROOF ASSEMBLY FOR VEHICLES HAVING A TARGA TOP

This is a continuation of application Ser. No. 07/457,890 filed Dec. 27, 1989.

BACKGROUND OF THE INVENTION

1. Field of the Invention

The present invention relates generally to accessories for vehicles and more specifically to a foldable roof panel which may be readily installed and removed from a vehicle top for enclosing same and particularly for vehicles having what is commonly known as a TARGA top.

2. Prior Art

Removable panels have been provided in the prior art wherein a pair of panels are disclosed in association with vehicle door openings at opposite sides of the vehicle. U.S. Pat. Nos. 2,556,062 and 4,120,529 disclosed examples of such panels. Such removable panels are commonly referred to as T-Tops or Hatch Tops and include rigid and heavy panel portions that are adapted to enclose the roof access openings which define the T-Top or Hatch Top configurations. The roof panels such as the type disclosed in U.S. Pat. No. 4,120,529 are large, relatively heavy and are difficult to use. In fact, because of their size and weight, they must typically be stored either in the trunk of the vehicle or left in storage facility such as a garage or the like. The roof panels for TARGA tops are typically even heavier and more cumbersome because they must cover a larger, continuous unitary opening as compared to T-Top roof panels. One of the principal disadvantages of such prior art, heavy and large roof panels, is the difficulty and time required to remove and then re-install such tops. Accordingly, many users are simply reluctant to remove them to begin with. This reluctance on the part of the user to remove the roof panels defeats the entire purpose of such roof configurations. It would therefore be desirable to provide a roof panel structure for TARGA tops which is relatively easy to manufacture inexpensively to permit the users of such TARGA top configured vehicles to quickly enclose the access opening without the need for having to utilize the more permanent and heavier roof panel that is provided by the manufacturer. One prior art attempt at solving this need as it relates to T-tops is disclosed in U.S. Pat. No. 4,330,150 which discloses the use of a wire frame which is foldable and a flexible fabric or plastic material stretched across the wire frame when the panel is unfolded. Unfortunately, such wire frame/fabric or plastic combination may tend to be too flimsy and provide insufficient structure to securely enclose a larger TARGA top opening, particularly at high speeds wherein wind induces extremely high forces that at the very least cause a rippling effect of the fabric stretched across the wire frame and at the worst could cause some form of structural damage to the frame or fabric covering. Furthermore, a lightweight fabric secured across a foldable wire frame generally gives the appearance of a convertible-type top and not the appearance of a permanent-type top or hard top which is more desirable from an aesthetic point of view.

Other relevant prior art known to the applicant herein includes: U.S. Pat. No. 3,348,877 which discloses a TARGA-type top which has a rigid frame and an accordian style folding flexible cover forming a relatively complex and unwieldy structure; and U.S. Pat. No. 4,138,155 which discloses T-Top vehicle roof panels involving vehicle body cutting and reinforcement.

Thus there still exists a need for an inexpensive, relatively lightweight, foldable roof panel configuration for TARGA top vehicles, but which nevertheless is of sufficient structural integrity to overcome the aforementioned disadvantages of the more recently issued prior art U.S. Pat. Nos. 4,330,150 and the prior art referenced therein.

SUMMARY OF THE INVENTION

The present invention satisfies the aforementioned need by providing a removable roof panel for motor vehicles of the type having a TARGA top opening framed by the side windows, a rigid roof portion extending rearwardly from the windshield and a rearward arch-shaped transverse header. The removable roof panel is adapted to cover the TARGA opening and includes a pair of lightweight, interconnectedly hinged lightweight panels, preferably made of a relatively low density material such as fiberglass. The edges of the pair of panels comprising the present invention, when unfolded, are adapted to mate with the described marginal edges of a motor vehicle, which may by way of example, be a 1984–1990 TARGA top Chevrolet Corvette.

A significant feature of the present invention comprises a novel spaced hinge which permits the folding of the fiberglass panels of the present invention relative to one another to thereby obviate the prior art requirement for a folding wire frame such as found in U.S. Pat. No. 4,330,150. The use of these novel hinges permits folding the fiberglass panels, one above the other, despite their relative thicknesses at the point of interconnection along the border regions thereof, which would otherwise not be possible using conventional hinges. The specific structure of this novel hinge, as well as structure of the panels themselves that form the present invention, will be described hereinafter in more detail. In a preferred embodiment as shown herein, a fabric such as vinyl, leather or the like is adhesively applied to the exterior surface of both panels in order to provide the exterior with a smooth, aesthetically pleasing surface finish and also to externally cover a space between the two panels that would otherwise be visible without such fabric covering. However, unlike the closest prior art in the aforementioned patent, the fabric that is used in the present invention does not form the principal structural material inside the border region or frame region and is not relied upon as the exclusive means to prevent entry through the entire top and into the vehicle of any undesirable elements such as rain and the like that would otherwise be a problem if the fabric in the prior art were not employed.

OBJECTS OF THE INVENTION

It is therefore a principal object of the present invention to provide an improved lightweight, foldable roof panel assembly for TARGA top-type vehicles, the foldability and lightweight aspects thereof permitting the user to easily and simply install or remove the roof assembly in a convenient manner.

It is an additional object of the present invention to provide a lightweight foldable TARGA top roof panel covering assembly employing a rigid, lightweight material throughout such as fiberglass and the like to thereby obviate the noise and other structural deficiencies of the closest prior art.

It is still an additional object of the present invention to provide an improved, foldable, lightweight TARGA top vehicle roof assembly which utilizes at least one unique spaced hinge device integrated into the fiberglass structure of two adjacent panels thereby obviating any requirement for a separate wire edge frame while accommodating the thickness of the fiberglass panels along the adjacent border regions thereof for folding one such panel into a 180 degree relationship with the other such panel.

BRIEF DESCRIPTION OF THE DRAWINGS

The aforementioned objects and advantages of the present invention, as well as additional objects and advantages thereof will be more fully understood hereinafter as a result of a detailed disclosure of a preferred embodiment when taken in conjunction with the following drawings in which.

DETAILED DESCRIPTION OF A PREFERRED EMBODIMENT

Figure 1:
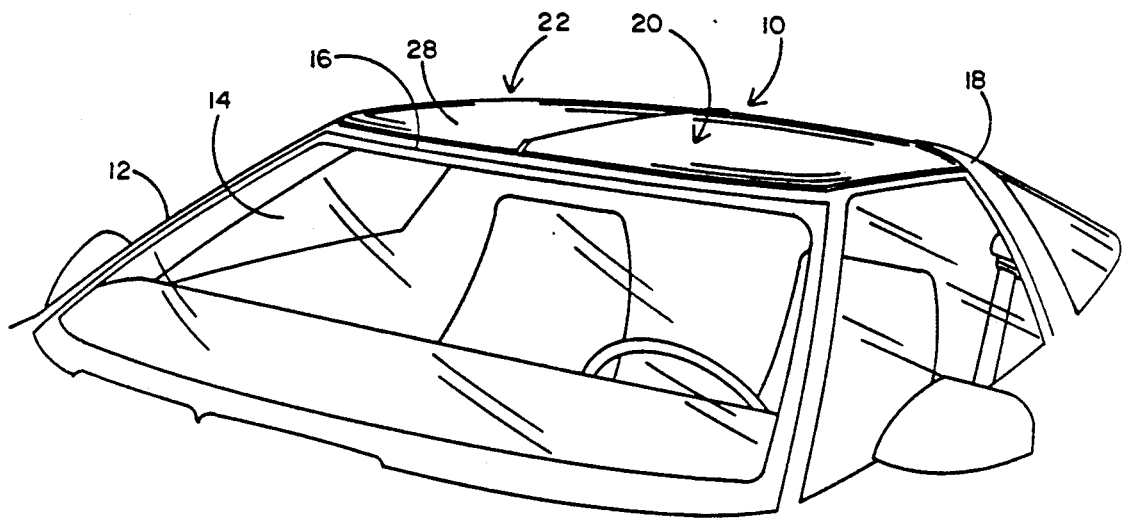
FIG. 1 is an isometric view of a portion of the vehicle showing the roof assembly of the present invention installed therein.
Figure 2:
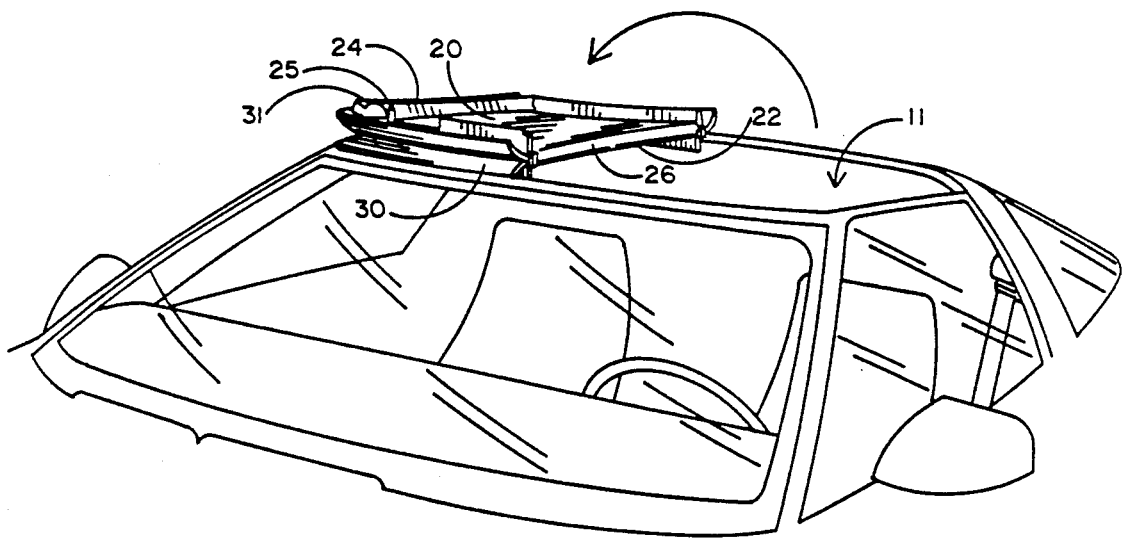
FIG. 2 is a view similar to that of FIG. 1, but showing the roof assembly of the present invention partially folded away from the driver's side and onto the passenger side of the vehicle.

Referring now first to FIGS. 1 and 2, it will be seen that the TARGA top, of the present invention is designed to be installed into the opening 11 of a vehicle 12 between a rigid roof portion 16 adjacent the windshield 14 and a rear arched roof header 18. Vehicle roof assembly 10 comprises a pair of hard top panels 20 and 22 which, as shown in FIG. 2, are designed to be folded about a fold region 26, thereby permitting easy removal and storage. In a preferred embodiment of the invention, the two panels 20 and 22 are formed of either solid or honeycomb fiberglass and are covered on their external surface, that is the surface external of the vehicle 12 when the assembly 10 is installed, with a flexible cover such as one made of a vinyl fabric similar to fabric used to cover vehicles having convertible tops. This fabric cover 28 is primarily ornamental as it is used in the present invention and does not serve a structural function. Fabric cover 28 does provide a rain and air impervious covering between the two panels 20 and 22 which are spaced apart along their adjacent edges so that they may be readily folded, one 180 degrees relative to the other, in the manner shown in FIG. 2.

Figure 3:
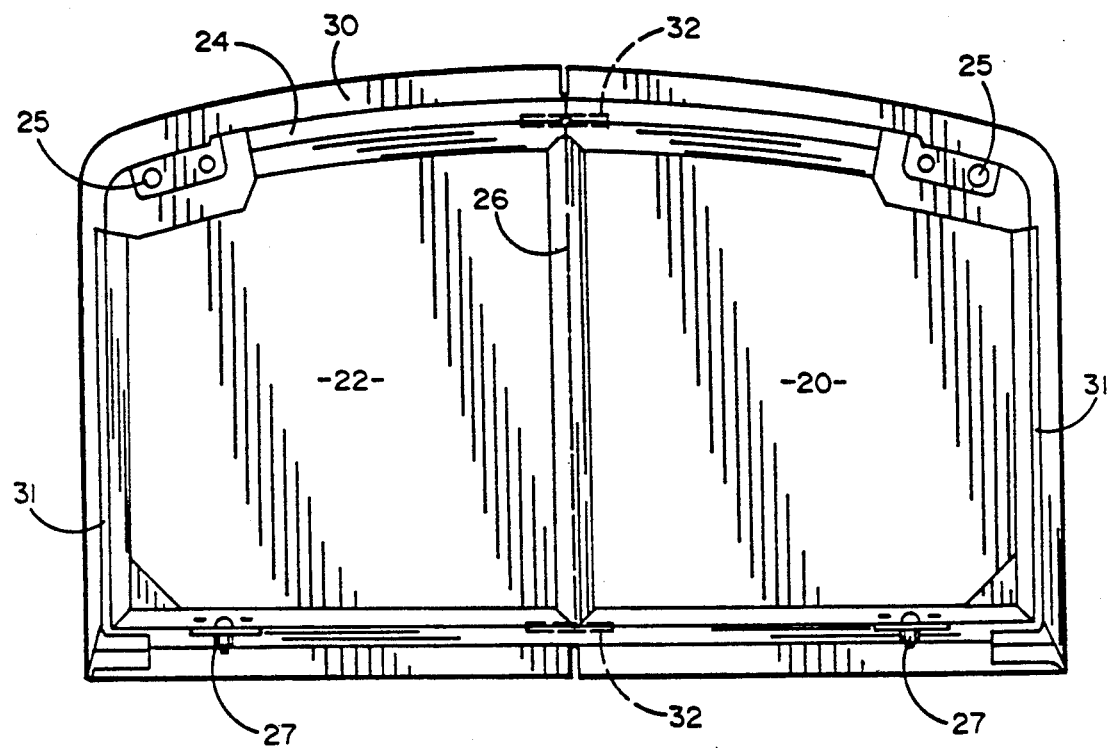
FIG. 3 is a plan view of the interior surface of the present invention showing the roof assembly thereof fully unfolded.
Figure 4:
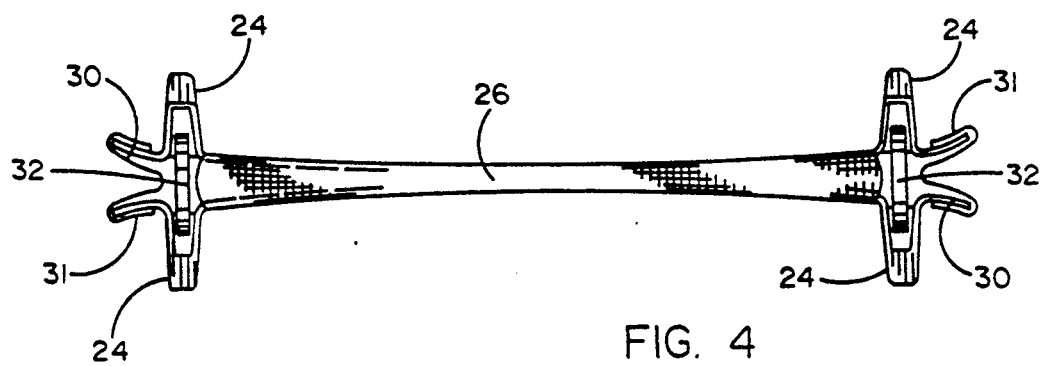
FIG. 4 is a plan view of the present invention shown in its fully folded configuration along the fold line thereof, illustrating the hinges of the invention.
Figure 5:
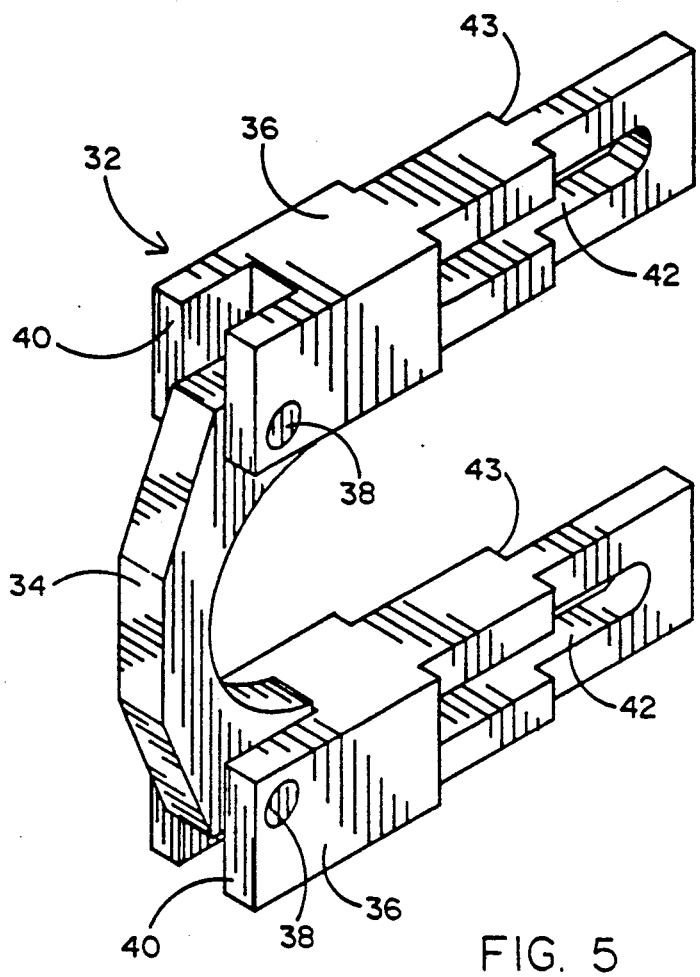
FIG. 5 is an isometric view of the novel hinge portion of the present invention.

More specifically, referring now to FIGS. 3 and 4, it will be seen that the panels 20 and 22 are of a generally rectangular configuration having edges shaped to conform to the marginal edges between the windshield and the rear roof header of the vehicle. A spacing 26 of approximately one inch in width is provided between panels 20 and 22 longitudinally along the assembly 10. Spacing 26 permits the two panels to be folded 180 degrees relative to one another when assembly 10 is not installed in the vehicle. A ridge 24 is provided along the outer edge of the roof assembly 10 in order to mate with the interior margin of the access opening provided in the roof of the vehicle. A conically-shaped, rubber coated protrusion 25 on each side of the forward portion of the assembly 10 is provided in the particular embodiment illustrated to mate with corresponding conical wells in the rigid roof portion 16 of a particular vehicle such as a Corvette having a TARGA roof. In addition, a pair of threaded couplings 27 are provided along the ridge 24 at the rear or lower-most margin of the roof assembly 10 as seen in FIG. 3 in order to provide means for firmly securing the top 10 to the vehicle 12. An overhang 30 along the periphery of ridge 24. The portion of the overhang 30 adjacent the sides of the roof assembly may be provided with sealing material such as flexible rubber seal 31 for providing a water impervious relationship between the windows of the vehicle and the roof assembly 10 when the windows are fully closed.

As seen further in FIG. 3, a pair of hinges 32 are secured within the fiberglass structure along ridge 24 in a manner to be described hereinafter in more detail in conjunction with FIGS. 5 through 8. Hinges 32 provide the structural interconnection between the respective panels 20 and 22. More specifically as shown in FIG. 4, hinges 32 are partially visible when the panels 20 and 22 are folded one on top of the other as viewed from the fold region 26 therebetween. As seen further in FIG. 4, the hinges 32 permit the two panels 20 and 22 to be folded into a double layer which permits easy maneuverability and storage of the folded roof assembly 10. Such 180 degree overlap of panels 20 and 22 reduce the overall size of the folded configuration to a more manageable dimension which can be easily accommodated in the rear compartment of the vehicle such as the rear compartment of a Corvette vehicle behind the driver and passenger seats where the top may be easily accessed for quick and easy installation.

The foldability of the present invention, which is clearly a significant feature for purposes of easy storage and installation or removal thereof from the vehicle roof is made possible by hinges 32, the detailed structure of which is shown in FIGS. 5 through 8. As seen in FIGS. 5 through 8, each such hinge 32 comprises a spacer 34 and a pair of insert members 36. The insert members 36 are connected to the spacer by means of a pair of rivets 38. Each such insert member comprises a yoke portion 40 integrally connected to a interconnector portion 42. In the preferred embodiment, interconnector 42 provides a stepped region 43 and a feed-through aperture 44. Aperture 44 is of elongated configuration along the step portion 43.

Figure 6:
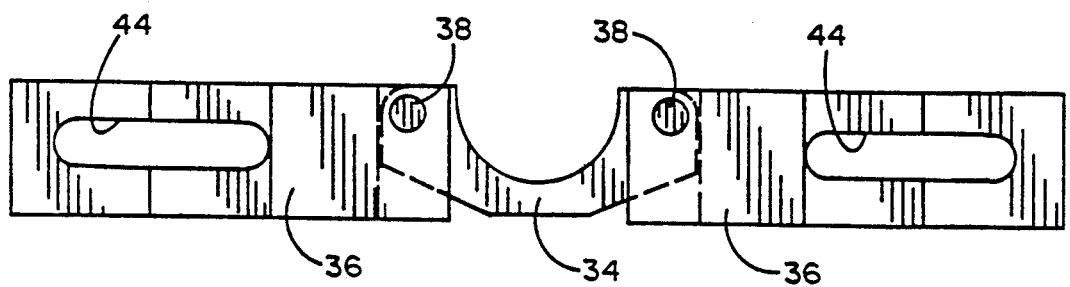
FIG. 6 is a plan view of the hinge assembly of the present invention in its fully unfolded configuration.
Figure 7:
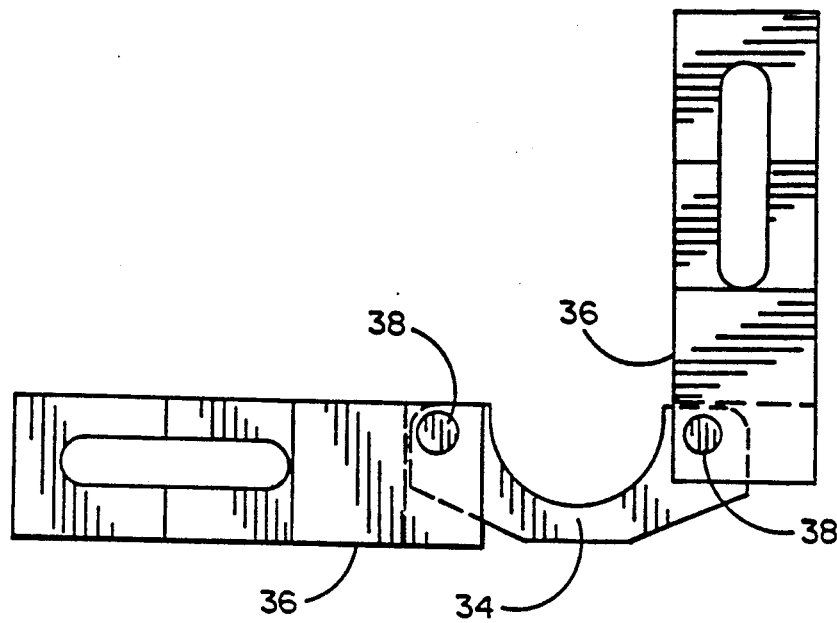
FIG. 7 is plan view of the hinge invention shown in a partially folded configuration.
Figure 8:
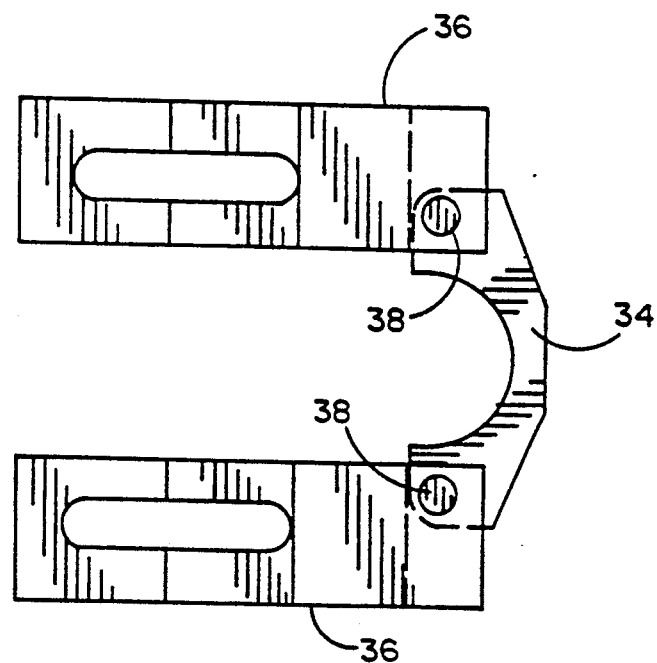
FIG. 8 is a plan view of the hinge assembly of the invention shown in a fully folded configuration.

FIG. 6 illustrates the configuration of the hinge 32 when the roof assembly 10 is in its fully unfolded configuration such as that shown in FIGS. 1 and 3. The hinge 32 is shown in its fully folded configuration in FIG. 8 and in an intermediate position between fully folded and fully unfolded in FIG. 7. The configuration of hinge 32 is designed to be installed during the fiberglass fabrication process prior to curing so that the spacer 34 is positioned along the fold region 26 seen best in FIG. 4. The respective insert members 36 are designed to be embedded into the respective portions of ridge 24 in each of the panels 20 and 22. The step portion 43 and the feed-through aperture 44 of interconnector 42 allow each insert member 36 to be firmly implanted into the fiberglass material. The mechanical interaction between the fiberglass of ridge 24 of each panel 20 and 22 and the hinge 32 is highly secure thereby assuring a firm, but foldable relationship between the respective panels. The significant features of the hinge 32 include the spacer 34 and insert members 36 which are structurally designed to be firmly implanted in a secure manner (without fittings or other hardware) in the fiberglass material forming the ridge 24 before the structure is cured with the material extending into the aperture. It will be understood however, that the precise shape and mechanical configuration of hinge 32 may be readily varied in other respects as long as these two functional objectives are satisfied.

It will now be understood that what has been disclosed herein comprises a novel TARGA top assembly which is of a lightweight, folding configuration adapted to be installed in the roof of a vehicle of the type having a rear roof portion and a forward roof portion. The TARGA top assembly of the present invention comprises a pair of fiberglass, contour-shaped panels having a ridge along the periphery thereof and being shaped to conform to the accessible region between the forward and rear roof portions of the vehicle. A fabric-type covering similar to those fabrics used for vinyl or convertible vehicle tops may be used on the exterior surface of the roof assembly of the present invention, primarily for aesthetic appearance purposes but also to prevent the spaced region between the two panels from admitting any rain or air during vehicle operation. A principal feature of the present invention comprises a novel hinge having a spacer and a pair of insert members, the latter being adapted to be implanted into the fiberglass material forming the aforementioned ridge preferably along the front and back margins of the ridge along the centerline of the roof assembly so that the two panels can be folded, one on top of the other, for easy storage.

Those having skill in the art to which the present invention pertains will now, as a result of the applicant's teaching herein, perceive various modifications and additions that may be made to the invention. By way of example, a preferred embodiment of the invention disclosed herein has been shown shaped for a particular vehicle, namely, a 1984-1990 Chevrolet Corvette. However, other vehicles having similar roof configurations namely, what is commonly referred to as a TARGA top can also use the present invention with appropriate modifications to adapt to the specific shape and size for the TARGA top opening of such alternative vehicles. In addition, the particular materials used herein and the shape and dimensions of the hinge of the present invention may be relatively altered in order to accomplish the same functional purposes herein described. Accordingly, all such modifications and additions are deemed to be within the scope of the invention which is to be limited only by the claims appended hereto.

I claim:

1. A removable panel assembly for motor vehicles of the type having a TARGA-type roof opening defined on the sides by the vehicle windows, on the forward edge by a rigid roof portion and on the rear edge by an arch-shaped transverse header; the assembly comprising:

a pair of adjacent rigid, lightweight unitary panels formed of fiberglass, each such panel shaped to cover about one-half of said roof opening, one such panel being adapted for installation above the driver side of said vehicle and the other being adapted for installation above the passenger side of said vehicle, said pair of panels being spaced apart one from the other to form a longitudinal gap therebetween for permitting 180 degree folding thereof;

a ridge projection along the outside edge of said panels for abutting the vehicle windows, rigid roof portion and header defining said roof opening;

means for securing said assembly to said vehicle at said roof opening for enclosing said opening; and at least one hinge affixing said panels to one another in 180 degrees folding relation permitting a folded configuration of said panel assembly which is only two panels in thickness, said hinge including:

(1) a spacer spanning said longitudinal gap and being shaped to span the adjacent edges of said panel, and (2) a pair of symmetrical insert members hingedly affixed to said spacer, each of said insert members being defined by a longitudinally extended member having a stepped surface contour on opposing sides thereof, said longitudinally extended member having an elongated slotted through opening extended between said opposing stepped surfaces, whereby each of said insert members are implanted in said fiberglass material of a respective one of said panels with said material extending into the openings for providing a coupling system devoid of external fasteners.

2. The assembly recited in claim 1 further comprising a layer of fabric lying over the exterior surface of said panels and said gap.

3. The assembly recited in claim 2 further comprising an overhang around at least a portion of said outside edge of said panels.

4. The assembly recited in claim 3 further comprising a resilient seal affixed to said ridge and to said overhang along at least a portion of said outside edge.

* * * * *